United States Patent Office 3,369,866
Patented Feb. 20, 1968

3,369,866
PRODUCTION OF SOLID POTASSIUM
METABISULFITE
Walter Spormann, Haus, and Joachim Heinke and Horst Luedemann, Ludwigshafen (Rhine), Germany, assignors to Badische Anilin- & Soda-Fabrik Aktiengesellschaft, Ludwigshafen (Rhine), Germany
No Drawing. Filed July 24, 1964, Ser. No. 385,051
Claims priority, application Germany, Aug. 14, 1963, B 73,119
4 Claims. (Cl. 23—114)

ABSTRACT OF THE DISCLOSURE

Sulfur dioxide or gases containing sulfur dioxide are reacted with aqueous solutions of potassium hydroxide and/or potassium carbonate by introducing reaction components simultaneously into an aqueous solution saturated with potassium sulfite and potassium bisulfite and reacting at temperatures between 50° and 80° C. After reaction mixture has cooled, deposited potassium metabisulfite is separated by a conventional method.

---

This invention relates to a process for the production of potassium metabisulfite ($K_2S_2O_5$) by reaction of sulfur dioxide or gases containing sulfur dioxide with aqueous solutions of potassium hydroxide and/or potassium carbonate.

Potassium metabisulfite ($K_2S_2O_5$), also known as potassium pyrosulfite) has already been prepared from solutions containing potassium hydroxide and/or potassium carbonate by treatment with gases containing sulfur dioxide. For this purpose, gases containing sulfur dioxide are passed into an aqueous solution of potassium hydroxide and/or potassium carbonate. Potassium sulfite ($K_2SO_3$) is first formed and this remains dissolved in the excess potassium hydroxide and/or potassium carbonate solution provided saturation has not been reached. When further sulfur dioxide is passed in, the potassium sulfite is converted to potassium bisulfite ($KHSO_3$), and then an aqueous solution of pure potassium metabisulfite is formed. To obtain the potassium metabisulfite therefrom in solid form, the solutions obtained may be evaporated, but appreciable decomposition of the salt takes place by disengagement of sulfur dioxide and by oxidation. The solid potassium metabisulfite obtained is highly contaminated by potassium sulfate which, as the more sparingly soluble salt, is separated almost quantitatively with the potassium metabisulfite. To prevent oxidation, the solution may be evaporated under subatmospheric pressure or in an atmosphere of an inert gas. Special apparatus is needed for this operation, but splitting off of sulfur dioxide is not thus avoided. Oxidation of potassium metabisulfite may also be lessened by adding oxidation inhibitors. This has the disadvantage that the product obtained is contaminated by the inhibitors. Again, the decomposition of the salt by splitting off of sulfur dioxide is not affected by the said additions.

To avoid evaporation it is possible to start the said process with such concentrated solutions containing potassium hydroxide and/or potassium carbonate that when they are treated with sulfur dioxide the solid salt is immediately formed. Since during the gassing of such concentrated solutions with gases containing sulfur dioxide, solid potassium sulfite is first formed and during further gassing potassium metabisulfite is formed from the dissolved potassium sulfite, the deposited crystals of potassium metabisulfite grow on the crystals of potassium sulfite present and completely envelop the latter so that the sulfur dioxide can only convert the potassium sulfite core into potassium metabisulfite by passing through the crystal envelope of potassium metabisulfite. The consequence of this is protracted gassing periods, low space-time yields and waste of sulfur dioxide. To avoid the latter, additional apparatus has to be provided. When roaster gases containing oxygen are used, the long gassing periods increase the loss by oxidation.

It is an object of the present invention to provide a process for producing potassium metabisulfite which is simple to carry out and which gives a product of high purity. This object is achieved in a single process step by reaction of sulfur dioxide or gases containing sulfur dioxide with aqueous solutions of potassium hydroxide and/or potassium carbonate, by introducing the reaction components, if desired at elevated temperature, into a saturated aqueous solution containing potassium sulfite and potassium bisulfite and separating the deposited potassium metabisulfite, if desired after previous cooling, from the solution by a conventional method.

The aqueous solution of potassium hydroxide and/or potassium carbonate used for the reaction may be concentrated, for example 50% by weight commercial caustic potash solution, but it is not an essential feature of the process according to this invention. A considerable proportion of water is evaporated, depending on the temperature at which the reaction is carried out and the content of inert gases or oxygen in the gas containing sulfur dioxide. Thus when using dry roaster gases which contain only about 5 to 10% by volume of sulfur dioxide in addition to oxygen and nitrogen, it is possible to use more dilute solutions, for example those which contain only 15% by weight of KOH, because a considerable proportion of water is removed from the solution with the oxygen and nitrogen. It is also possible to replace a portion of the solutions containing potassium hydroxide and/or potassium carbonate supplied to the mixture by aqueous potassium sulfite solutions.

The solution containing potassium sulfite and potassium bisulfite into which the reaction components are introduced may be prepared by any method, for example by introducing sulfur dioxide into an aqueous solution of potassium hydroxide and/or potassium carbonate until the pH of the solution is between 4 and 7.5. The concentration of the solution should be such that solid potassium sulfite does not separate on gassing. The pH may be adjusted by dissolving potassium bisulfite or potassium sulfite in the solution and adding a base or acid.

It is advantageous to take steps to ensure that the pH value of the reaction does not rise above the value of about 7.5. Surprisingly, the deposited solid consists of pure potassium metabisulfite which may be separated from the mother liquor by conventional methods, for example by filtration or centrifuging, although not only bisulfite ions but also sulfite ions are present in considerable concentration in the solution. It is also surprising that by the process according to this invention no solid potassium sulfite is deposited as an intermediate stage if the reaction components are passed into the already formed suspension of potassium disulfite.

The process may be carried out continuously or batchwise. When working continuously, it is advantageous in order to achieve a high space-time yield to use two successive reactors. For example an aqueous solution of potassium sulfite and potassium bisulfite having a pH-value of about 7.0 is placed in the first reactor. A solution containing potassium hydroxide, and the gas containing sulfur dioxide, preferably a roaster gas having a sulfur dioxide content of about 7 to 10% by volume and an oxygen content of 10 to 13% by volume are passed simultaneously at separate places into the solution in the first reactor with vigorous stirring.

The rate of introduction of the initial materials is regulated so that the pH value of the reaction solution does not rise above 7.5. The temperature of the reaction mixture should advantageously be about 50° to 80° C. in order to obtain the highest possible concentration of salt in the solution. The reaction mixture is continuously withdrawn and passed into the second reactor in which it is cooled to temperatures below 30° C., preferably to temperatures of 15° to 25° C. Further potassium metabisulfite is precipitated here because the solubility thereof decreases markedly with falling temperature, whereas potassium sulfite remains in solution because its solubility is practically independent of the temperature. In order to convert at least part of the potassium sulfite into potassium metabisulfite, further sulfur dioxide may be passed into the second reactor. It is advantageous to stop gassing when the solution has reached a pH value of 5.5 because below this value the absorption of sulfur dioxide in the solution decreases considerably. Therefore if the gassing be stopped at a pH value of 5.5, the best yields are obtained with reference to the amount of sulfur dioxide used. When the potassium metabisulfite has been separated, the mother liquor is returned to the first reactor. Obviously, the reaction may also be carried out in more than two reactors.

In the batchwise embodiment of the process according to this invention, a similar procedure to that described above is followed. The reaction is similarly carried out at elevated temperatures and the pH value is not allowed to rise above about 7.5. The reaction is stopped when a pH value of 5.5 has been reached and the suspension obtained is cooled to room temperature. When the potassium metabisulfite precipitated has been separated, the mother liquor may be used for the next batch.

Potassium metabisulfite prepared by the process according to this invention, as compared with a salt made by prior art methods, has an extremely high purity. Its $SO_2$ content is as a rule more than 56.5%.

The invention is further illustrated by the following example.

*Example*

760 kg. per hour of aqueous 50% potassium hydroxide solution and 375 kg. of an aqueous 40% by weight potassium sulfite solution are continuously added to 6 m.$^3$ of a mash consisting of 800 kg. of solid potassium metabisulfite and an aqueous solution of 18% by weight of potassium bisulfite and 22% by weight of potassium sulfite, while stirring vigorously in a container fitted with a stirrer. At the same time, roaster gas containing 7% of sulfur dioxide is passed into the solution at such a rate that the pH value of the solution is between 7 and 7.5. The temperature of the solution is kept at about 60° C. An amount of mash, equivalent to the supply, is continuously transferred to a second container. By passing in further roaster gas, the pH value here is kept at about 5.5 while the temperature is kept at about 20° C. by cooling. 770 kg. per hour of solid potassium metabisulfite is obtained which may be separated by conventional methods from the mother liquor which contains about 31% by weight of potassium bisulfite and 0.5% by weight of potassium sulfite. The dried potassium metabisulfite contains 56.5% of $SO_2$.

We claim:

1. A process for the production of solid potassium metabisulfite by reacting pure gaseous sulfur dioxide or gases containing sulfur dioxide with an at least 15% by weight aqueous solution of a compound selected from the group consisting of potassium hydroxide, potassium carbonate and mixture thereof, which comprises introducing the reaction components simultaneously and under vigorous stirring into a saturated aqueous solution containing potassium sulfite and potassium bisulfite at a pH value of above 4 to 7.5 and at temperature between 50° and 80° C., cooling the reaction mixture to a temperature below 30° C., and separating the deposited potassium metabisulfite.

2. A process as claimed in claim 1, wherein said saturated aqueous solution contains potassium metabisulfite in addition to said potassium sulfite and potassium bisulfite.

3. A process as claimed in claim 1, wherein said reaction mixture is cooled to a temperature in the range of about 15° to 25° C.

4. A process for the continuous production of solid potassium metabisulfite by reacting pure gaseous sulfur dioxide or gases containing sulfur dioxide with an at least 15% by weight aqueous solution of a compound selected from the group consisting of potassium hydroxide, potassium carbonate and mixtures thereof, which comprises introducing the reaction components simultaneously under vigorous stirring into a first reaction zone containing a saturated aqueous solution of potassium sulfite and potassium bisulfite of pH 7 to 7.5 at temperatures between 50° and 80° C., transferring the resultant reaction solution to a second reaction zone and cooling it therein to a temperature in the range of about 15° to 25° C., supplying pure gaseous sulfur dioxide or gases containing sulfur dioxide to said second reaction zone until the pH of the solution reaches a value of 5.5, and separating the deposited potassium metabisulfite.

References Cited

UNITED STATES PATENTS 1,638,492   8/1927   Laury _____ 23—114

OTHER REFERENCES

Fernelius, "Inorganic Syntheses," vol. II, McGraw-Hill Book Company, New York, 1946, pp. 162, 167.

EARL C. THOMAS, *Primary Examiner.*